US012584752B2

(12) United States Patent
Hsu et al.

(10) Patent No.: US 12,584,752 B2
(45) Date of Patent: Mar. 24, 2026

(54) VISUAL VEHICLE-POSITIONING FUSION SYSTEM AND METHOD THEREOF

(71) Applicant: Automotive Research & Testing Center, Lugang (TW)

(72) Inventors: Chih-Yuan Hsu, Lugang (TW); Nong-Hong Lin, Lugang (TW); Ting-Fu Jhu, Lugang (TW); You-Sian Lin, Lugang (TW); Shih-Hsuan Lin, Lugang (TW)

(73) Assignee: AUTOMOTIVE RESEARCH & TESTING CENTER, Lugang (TW)

( * ) Notice: Subject to any disclaimer, the term of this patent is extended or adjusted under 35 U.S.C. 154(b) by 108 days.

(21) Appl. No.: 18/527,906

(22) Filed: Dec. 4, 2023

(65) Prior Publication Data

US 2025/0180361 A1    Jun. 5, 2025

(51) Int. Cl.
*G01C 21/30*        (2006.01)
*G06T 7/73*        (2017.01)

(52) U.S. Cl.
CPC ............... *G01C 21/30* (2013.01); *G06T 7/73* (2017.01); *G06T 2207/10028* (2013.01); *G06T 2207/20221* (2013.01); *G06T 2207/30252* (2013.01)

(58) Field of Classification Search
CPC . G01C 21/30; G06T 7/73; G06T 2207/10028; G06T 2207/20221; G06T 2207/30252
See application file for complete search history.

(56) References Cited

U.S. PATENT DOCUMENTS

| | | | | |
|---|---|---|---|---|
| 10,176,596 B1 * | 1/2019 | Mou | ..................... | G01S 17/931 |
| 10,269,104 B2 * | 4/2019 | Hannuksela | .............. | G06T 5/50 |

(Continued)

FOREIGN PATENT DOCUMENTS

| | | | | |
|---|---|---|---|---|
| CN | 112577499 B | 10/2022 | | |
| KR | 102136924 B1 * | 12/2019 | ............. | G01S 19/23 |

(Continued)

OTHER PUBLICATIONS

Cui et al., "An improved SLAM based on RK-VIF: Vision and inertial information fusion via Runge-Kutta method", Defence Technology, vol. 21, 2021, pp. 133-146.

(Continued)

*Primary Examiner* — Nicholas Augustine
(74) *Attorney, Agent, or Firm* — Birch, Stewart, Kolasch & Birch, LLP

(57) ABSTRACT

A visual vehicle-positioning fusion system and a method thereof is provided. In the method, an image point cloud map stored in a storage device is converted into a longitude and latitude database corresponding to the image point cloud map. Longitude and latitude measurement coordinates received by a positioning device are used as first location information. The longitude and latitude database is compared with the longitude and latitude measurement coordinates to generate the initial location of a vehicle. Feature matching is performed on the initial location and the image point cloud map to generate second location information of the vehicle on the image point cloud map. The first location information or the second location information is selected as a final positioning output information and outputted based on a positioning fusion rule.

10 Claims, 11 Drawing Sheets

(56)                 References Cited

U.S. PATENT DOCUMENTS

| | | | | |
|---|---|---|---|---|
| 11,348,269 | B1 * | 5/2022 | Ebrahimi Afrouzi ... | G01S 17/48 |
| 11,366,238 | B2 | 6/2022 | Cvijetic et al. | |
| 2023/0043931 | A1 * | 2/2023 | Urtasun ................. | G06N 3/084 |
| 2023/0322259 | A1 * | 10/2023 | Sadek .................... | G01C 21/32 |
| | | | | 701/23 |
| 2024/0296583 | A1 * | 9/2024 | Kulp ......................... | G06T 7/73 |
| 2025/0131529 | A1 * | 4/2025 | Parker ...................... | G06T 7/80 |

FOREIGN PATENT DOCUMENTS

| | | | |
|---|---|---|---|
| TW | 1711804 | B | 12/2020 |
| TW | 1748678 | B | 12/2021 |
| TW | M624897 | U | 3/2022 |
| TW | I788177 | B | 12/2022 |

OTHER PUBLICATIONS

Pending unpublished U.S. Appl. No. 18/085,146 by inventors Chih-Yuan Hsu, Te-Hsiang Wang, and You-Sian Lin, filed Dec. 20, 2022, with official fiiling receipt and specification of the application attached herewith.

* cited by examiner

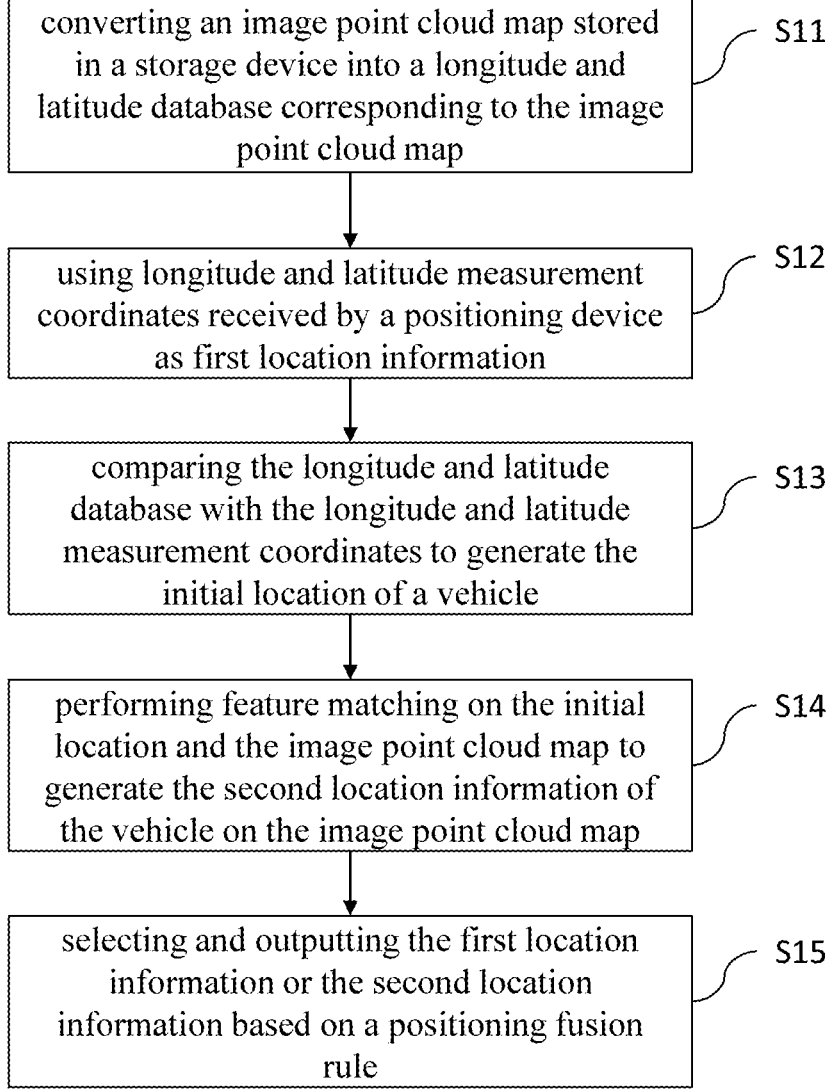

converting an image point cloud map stored in a storage device into a longitude and latitude database corresponding to the image point cloud map — S11 using longitude and latitude measurement coordinates received by a positioning device as first location information — S12 comparing the longitude and latitude database with the longitude and latitude measurement coordinates to generate the initial location of a vehicle — S13 performing feature matching on the initial location and the image point cloud map to generate the second location information of the vehicle on the image point cloud map — S14 selecting and outputting the first location information or the second location information based on a positioning fusion rule — S15

Fig. 8

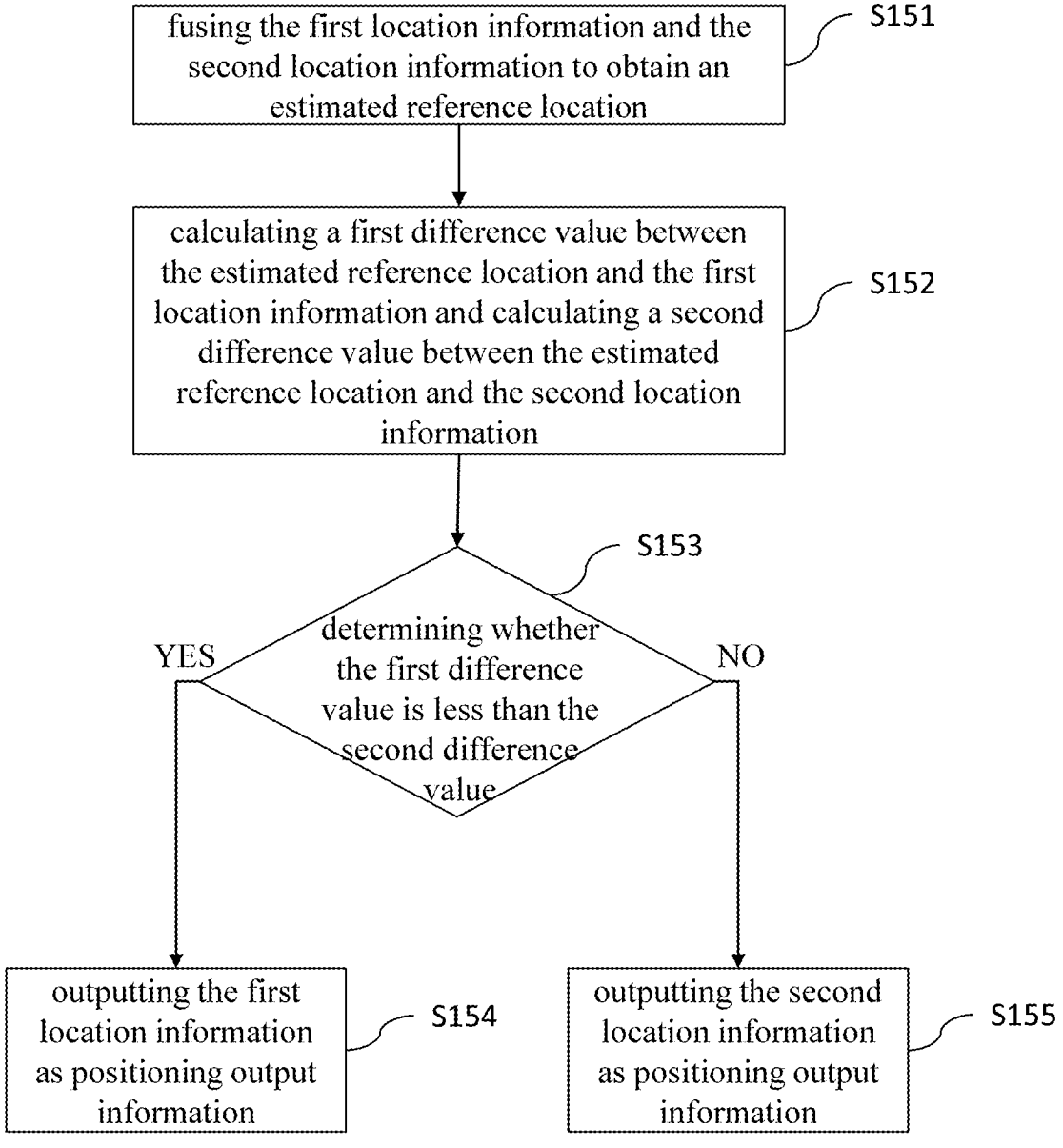

fusing the first location information and the second location information to obtain an estimated reference location — S151 calculating a first difference value between the estimated reference location and the first location information and calculating a second difference value between the estimated reference location and the second location information — S152 determining whether the first difference value is less than the second difference value — S153

YES

NO outputting the first location information as positioning output information — S154 outputting the second location information as positioning output information — S155

Fig. 9

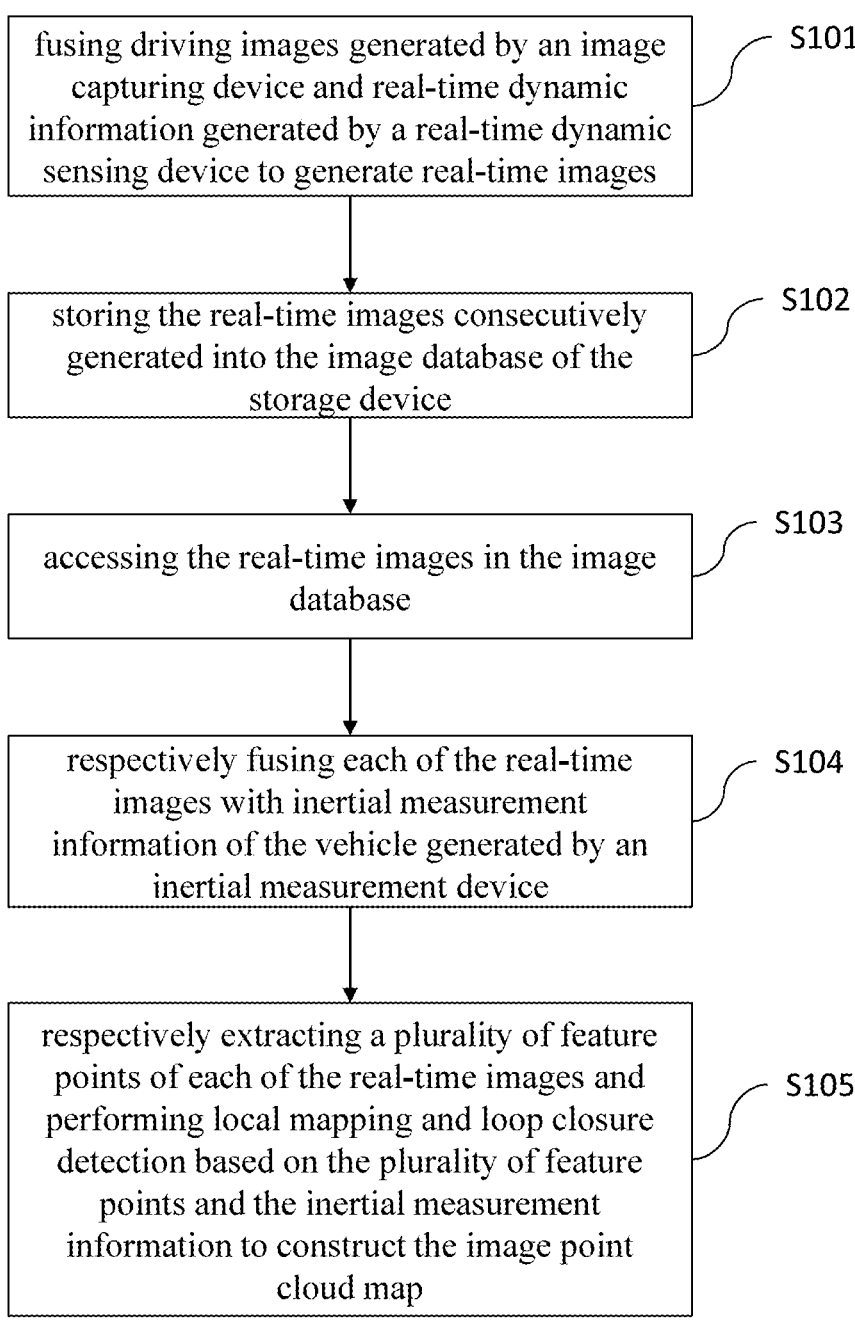

fusing driving images generated by an image capturing device and real-time dynamic information generated by a real-time dynamic sensing device to generate real-time images — S101 storing the real-time images consecutively generated into the image database of the storage device — S102 accessing the real-time images in the image database — S103 respectively fusing each of the real-time images with inertial measurement information of the vehicle generated by an inertial measurement device — S104 respectively extracting a plurality of feature points of each of the real-time images and performing local mapping and loop closure detection based on the plurality of feature points and the inertial measurement information to construct the image point cloud map — S105

Fig. 10

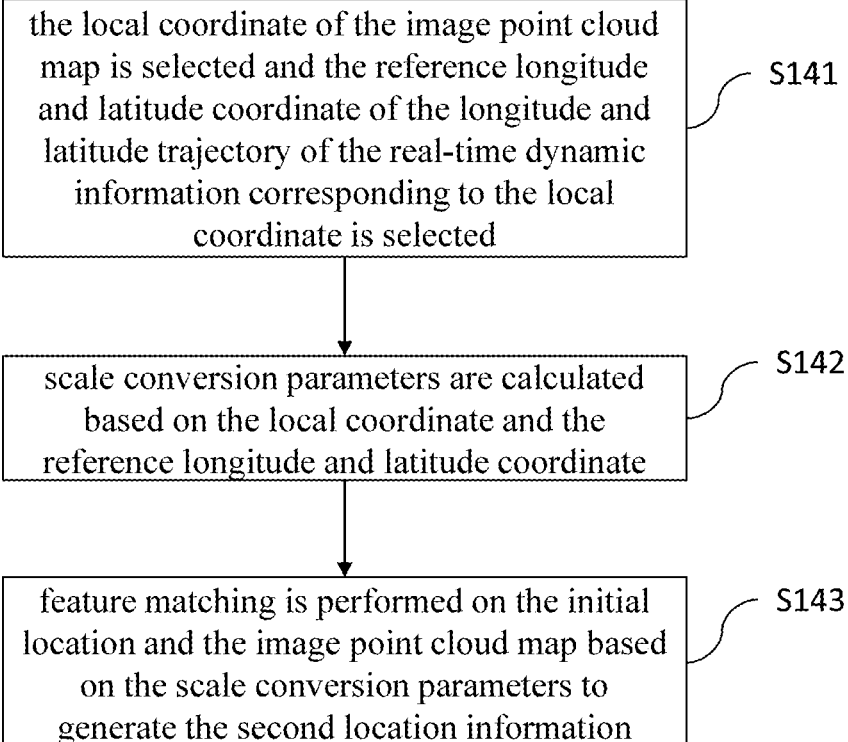

the local coordinate of the image point cloud map is selected and the reference longitude and latitude coordinate of the longitude and latitude trajectory of the real-time dynamic information corresponding to the local coordinate is selected ⟋ S141 scale conversion parameters are calculated based on the local coordinate and the reference longitude and latitude coordinate ⟋ S142 feature matching is performed on the initial location and the image point cloud map based on the scale conversion parameters to generate the second location information ⟋ S143

Fig. 11

VISUAL VEHICLE-POSITIONING FUSION SYSTEM AND METHOD THEREOF

BACKGROUND OF THE INVENTION

Field of the Invention

The present invention relates to a vehicle-positioning system and a method thereof, particularly to a visual vehicle-positioning fusion system and a method thereof.

Description of the Related Art

With technological advancements, obtaining precise location information on the road has become a fundamental requirement for autonomous vehicles. In addition to the continuous development of positioning technology, related industries have emerged, including intelligent transportation and logistics. The conventional positioning technology includes global positioning system (GPS), inertial measurement unit (IMU), light detection and ranging (LiDAR), and cameras. However, the existing positioning technology has technical limitations and shortcomings. For example, the stability of the GPS can be easily affected by environmental interferences. The GPS may be shield in urban environments with clusters of buildings or in environments like tunnels. In adverse weather conditions, the signal may fail to be received properly. The IMUs may accumulate errors over time. LiDAR is associated with higher costs and prices and susceptible to weather conditions. For instance, in weather conditions such as heavy rain, snow, or dense fog, it is difficult for the LiDAR to position accurately. Although cameras are the mainstream sensors for autonomous driving functions, they are susceptible to weather and lighting conditions, easily leading to misjudgments.

In other words, relying on a single type of positioning sensor is susceptible to changes in the surrounding environment, thereby affecting reliability. Depending merely on a single type of positioning sensor often leads to misjudgments or inaccurate analyses in positioning sensing, failing to meet current usage demands. Furthermore, a single type of positioning sensor has its technical limitations, which means that autonomous driving functions may not cover everything, thereby potentially increasing risks and leading to accidents.

Accordingly, the present invention provides a visual vehicle-positioning fusion system and a method thereof to overcome the abovementioned problems.

SUMMARY OF THE INVENTION

The primary objective of the present invention is to provide a visual vehicle-positioning fusion system and a method thereof, which improve the accuracy and reliability of positioning vehicles and avoid using positioning sensors with high prices, thereby reducing the overall cost and improving industrial applications.

In order to achieve the foregoing objectives, the present invention provides a visual vehicle-positioning fusion system, which is suitable for the on-board system of a vehicle. The visual vehicle-positioning fusion system includes a storage device, a positioning device, and a processing device. The storage device is configured to store an image point cloud map. The positioning device is arranged on the vehicle and configured to receive the longitude and latitude measurement coordinates of the vehicle. The processing device is configured to convert the image point cloud map into a longitude and latitude database corresponding to the image point cloud map, use the longitude and latitude measurement coordinates as first location information, compare the longitude and latitude database with the longitude and latitude measurement coordinates to generate the initial location of the vehicle, perform feature matching on the initial location and the image point cloud map to generate second location information of the vehicle on the image point cloud map, and select and output the first location information or the second location information based on a positioning fusion rule.

In an embodiment, the visual vehicle-positioning fusion system further includes an image capturing device and a real-time dynamic sensing device. The image capturing device is arranged on the vehicle and configured to generate driving images. The real-time dynamic sensing device is arranged on the vehicle and configured to generate the real-time dynamic information of the vehicle. The processing device is configured to fuse the driving images and the real-time dynamic information to generate real-time images. The storage device has an image database that is configured to store the real-time images consecutively generated.

In an embodiment, the visual vehicle-positioning fusion system further includes an inertial measurement device is arranged on the vehicle and configured to generate the inertial measurement information of the vehicle. The processing device is configured to access the real-time images in the image database, respectively fuse each of the real-time images with the inertial measurement information, respectively extract a plurality of feature points of each of the real-time images, and perform local mapping and loop closure detection based on the plurality of feature points and the inertial measurement information to construct the image point cloud map.

In order to achieve the objectives of the present invention, the present invention provides a visual vehicle-positioning fusion method that is performed by a processing device. The visual vehicle-positioning fusion method includes: converting an image point cloud map stored in a storage device into a longitude and latitude database corresponding to the image point cloud map; using longitude and latitude measurement coordinates received by a positioning device as first location information; comparing the longitude and latitude database with the longitude and latitude measurement coordinates to generate the initial location of a vehicle; performing feature matching on the initial location and the image point cloud map to generate the second location information of the vehicle on the image point cloud map; and selecting and outputting the first location information or the second location information based on a positioning fusion rule.

To sum up, the visual vehicle-positioning fusion system and the method thereof of the present invention can improve the accuracy and reliability of the autonomous driving system, employ the global satellite positioning system to obtain low-precision longitude and latitude, and quickly find the high-precision initial location of the vehicle, so that the need for a single expensive sensor is eliminated to reduce costs and increase accuracy.

Below, embodiments are described in detail in cooperation with the attached drawings to make easily understood the characteristics and accomplishments of the present invention.

BRIEF DESCRIPTION OF THE DRAWINGS

FIGS. 8-11 are flowcharts of a visual vehicle-positioning fusion method according to one embodiment of the present invention.

DETAILED DESCRIPTION OF THE INVENTION

Figure 1:
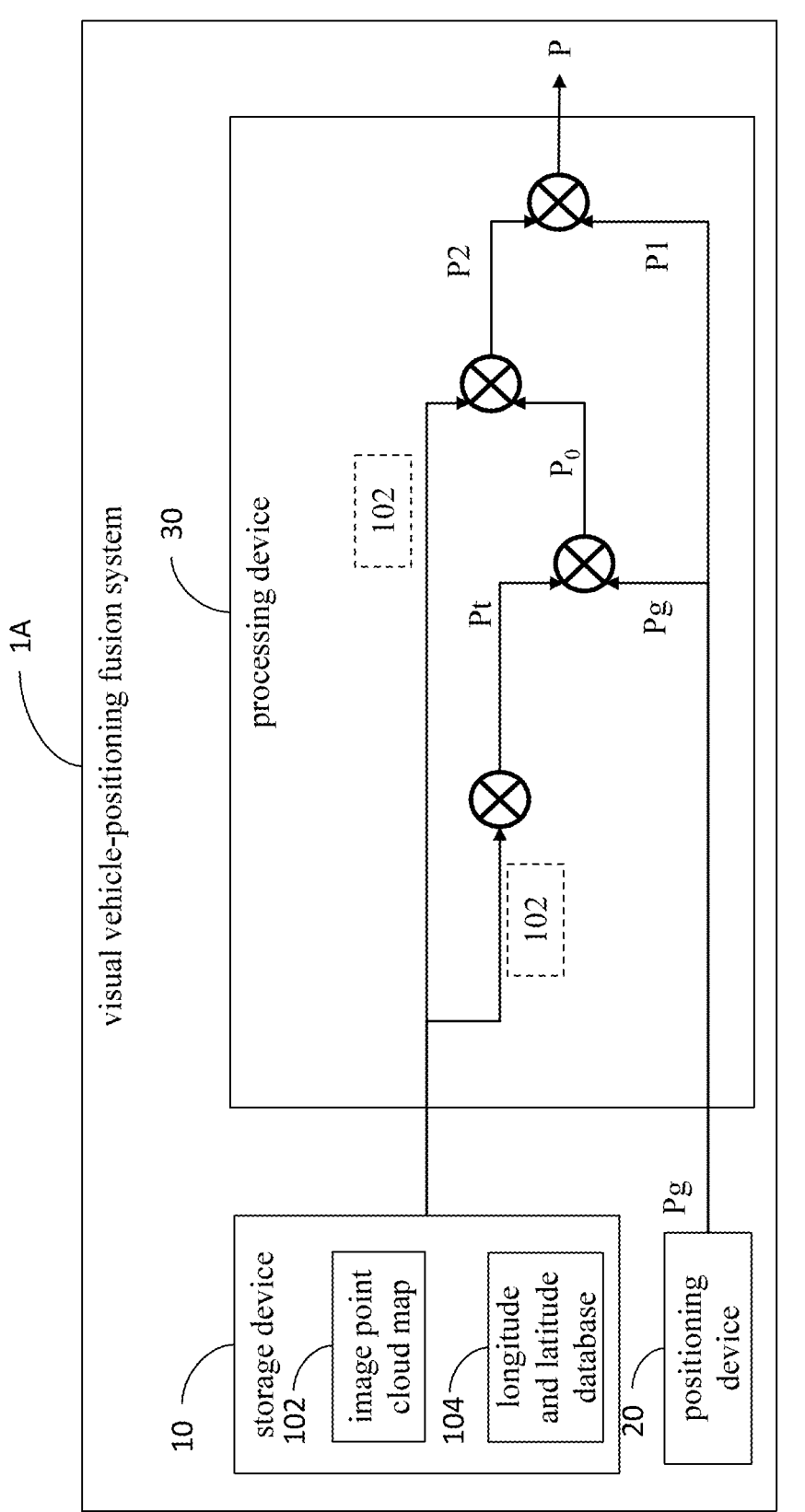
FIG. 1 is a block diagram schematically showing a visual vehicle-positioning fusion system according to a first embodiment of the present invention.

The present invention will be described in detail with embodiments and attached drawings below. Similar or identical elements are denoted with similar or identical symbols in the drawings. In the drawings, the shapes or thicknesses may be exaggerated intentionally to make presentation simpler and labeling easier. The elements that are well known by the persons skilled in the art are not necessarily described in the specification or depicted in the drawings. Further, the persons having ordinary knowledge in the field should be able to make modification or variation according to the specification of the present invention. However, it should be noted: any modification or variation made according to the spirit or technical contents disclosed in the specification of the present invention is to be also included by the scope of the present invention.

Figure 2:
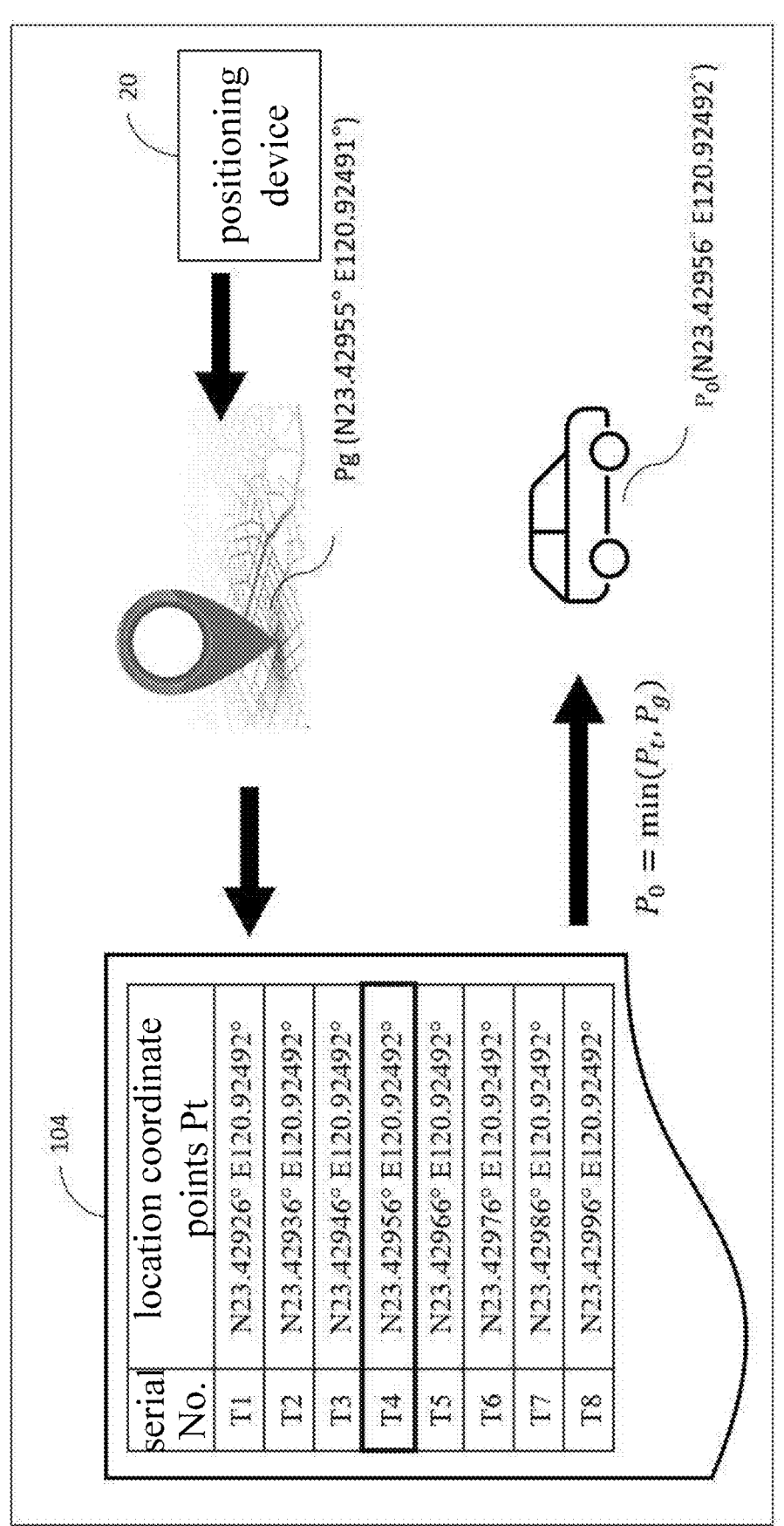
FIG. 2 is a diagram schematically showing that the visual vehicle-positioning fusion system generates the initial location of a vehicle according to the first embodiment of the present invention.

Please refer to FIG. 1. In a first embodiment, a visual vehicle-positioning fusion system 1A includes a storage device 10, a positioning device 20, and a processing device 30. The storage device 10 stores the image point cloud map 102 of a vehicle. The positioning device 20 is arranged on the vehicle and configured to receive the longitude and latitude measurement coordinates Pg of the vehicle. The processing device 30 converts the image point cloud map 102 into a longitude and latitude database 104 corresponding to the image point cloud map 102. The processing device 30 uses the longitude and latitude measurement coordinates Pg as first location information P1. The processing device 30 compares the longitude and latitude database 104 with the longitude and latitude measurement coordinates Pg to generate the initial location P₀ of the vehicle. The processing device 30 performs feature matching on the initial location P₀ and the image point cloud map 102 to generate the second location information P2 of the vehicle on the image point cloud map 102. The processing device 30 selects and outputs the first location information P1 or the second location information P2 based on a positioning fusion rule. The storage device 10 includes a longitude and latitude database 104 corresponding to the image point cloud map 102. The image point cloud map 102 includes a plurality of point cloud map data P₀ int. When the plurality of point cloud map data P₀ int are stored, a plurality of corresponding location coordinate points Pt are synchronously recorded. The processing device 30 transfers the location coordinate points Pt corresponding to the plurality of point cloud map data P₀ int into the longitude and latitude database 104, as shown in FIG. 2. The positioning device 20 may receive the global positioning system (GPS) signal of a global navigation satellite system (GNSS) to obtain the location information of the vehicle, such as a longitude, a latitude, an altitude, etc.

Please refer to FIG. 1 and FIG. 2. When the processing device 30 obtains the present longitude and latitude measurement coordinates Pg, the processing device 30 compares the location coordinate points Pt in the longitude and latitude database 104 with the longitude and latitude measurement coordinates Pg and queries the longitude and latitude database 104 to generate the initial location P₀ of the vehicle. For example, the positioning device 20 obtains the present longitude and latitude measurement coordinates Pg of the vehicle, which is represented by (N23.42955° E120.92491°). The processing device 30 queries the location coordinate points Pt (i.e., from serial number T1 to serial number T8) in the longitude and latitude database 104 and obtains the location coordinate points Pt, which is closest to the present longitude and latitude measurement coordinates Pg and used as the initial location P₀. The initial location P₀ is expressed by equation (1).

$$P_0 = \min(P_t, P_g) \tag{1}$$

As a result, the processing device 30 queries the longitude and latitude database 104 to obtain the initial location P₀ corresponding to serial number T4 (N23.42956° E120.92492°). According to the low-precision longitude and latitude measurement coordinates Pg, the high-precision initial location P₀ of the vehicle may be rapidly looked up.

Please refer to FIG. 1, FIG. 3A, FIG. 3B, and FIG. 4. The processing device 30 selects and outputs the first location information P1 or the second location information P2 as positioning output information P based on the positioning fusion rule, which is introduced as follows.

Figure 4:
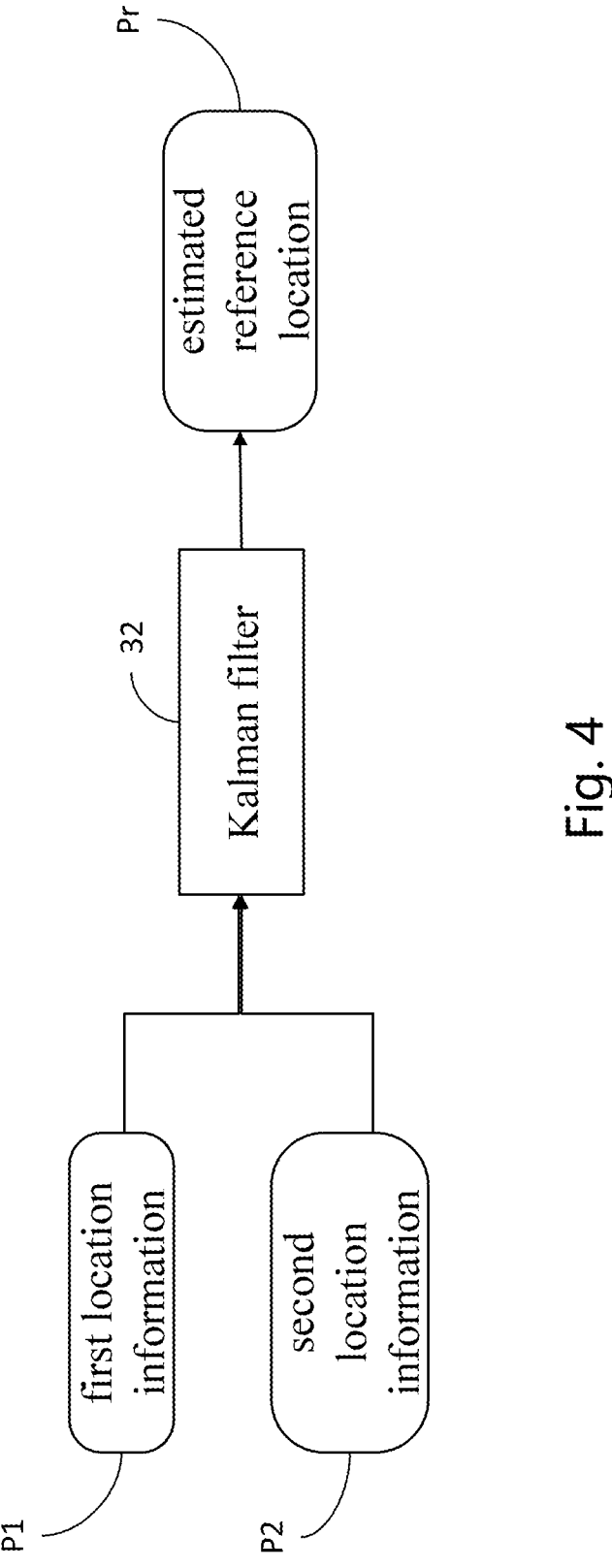
FIG. 4 is a diagram schematically showing that the processing device of the visual vehicle-positioning fusion system uses a Kalman filter to generate an estimated reference location according to the first embodiment of the present invention.

Firstly, the processing device 30 fuses the first location information P1 and the second location information P2 to obtain an estimated reference location Pr. As shown in FIG. 4, the processing device 30 may use a Kalman filter 32 and inputs the first location information P1 and the second location information P2 to the Kalman filter 32 to generate the estimated reference location Pr. Furthermore, the processing device 30 calculates a first difference value D1 between the estimated reference location Pr and the first location information P1 and calculates a second difference value D2 between the estimated reference location Pr and the second location information P2. The first difference value D1 is a difference between the first location information P1 and the estimated reference location Pr (i.e., the distance between P1 and Pr). The second difference value D2 is a difference between the second location information P2 and the estimated reference location Pr (i.e., the distance between P2 and Pr).

The positioning fusion rule defines to use the first location information P1 outputted by the processing device 30 as the positioning output information P when the first difference value D1 less than the second difference value D2 and defines to use the second location information P2 outputted by the processing device 30 as the positioning output information P when the second difference value D2 less than the first difference value D1. That is to say, the processing device 30 selects one of the first location information P1 and the second location information P2 as the positioning output information P. A difference between the estimated reference location Pr and one of the first location information P1 and the second location information P2 selected by the processing device 30 is minimal.

Figure 3A:
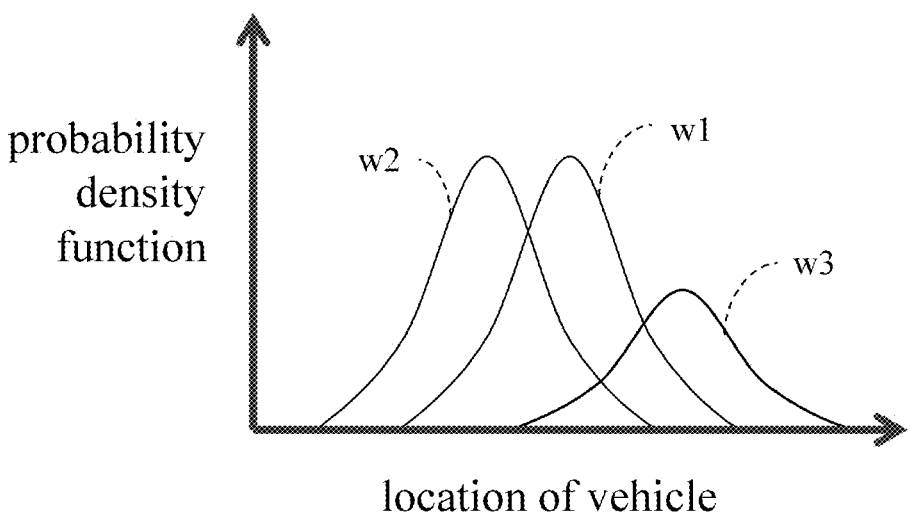
FIG. 3A and FIG. 3B are diagrams schematically showing that the processing device of the visual vehicle-positioning fusion system selects and outputs first location information or second location information according to the first embodiment of the present invention.
Figure 3B:
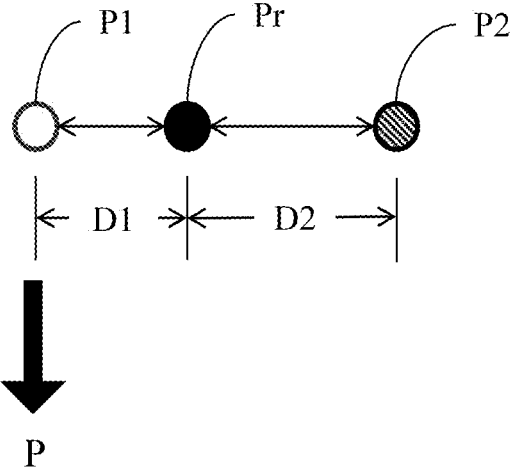

During the travel of the vehicle, the vehicle may not necessarily be able to move forward smoothly at constant speed. Therefore, the probability density function is used to represent the estimated possible location of the vehicle at a time point. By measuring the obtained location, it can assist in confirming the location of the vehicle. FIG. 3A shows a first waveform w1, a second waveform w2, and a third waveform w3. The first waveform w1 represents the estimated reference location Pr. The second waveform w2 represents the longitude and latitude measurement coordinates Pg, namely the first location information P1. The third waveform w3 represents the second location information P2. As shown in FIG. 3B, when the processing device calculates the first difference value D1 and the second difference value D2, the processing 30 may determines that D1<D2. As a result, the processing device 30 outputs the first location information P1 as the positioning output information P based on the positioning fusion rule.

Figure 5:
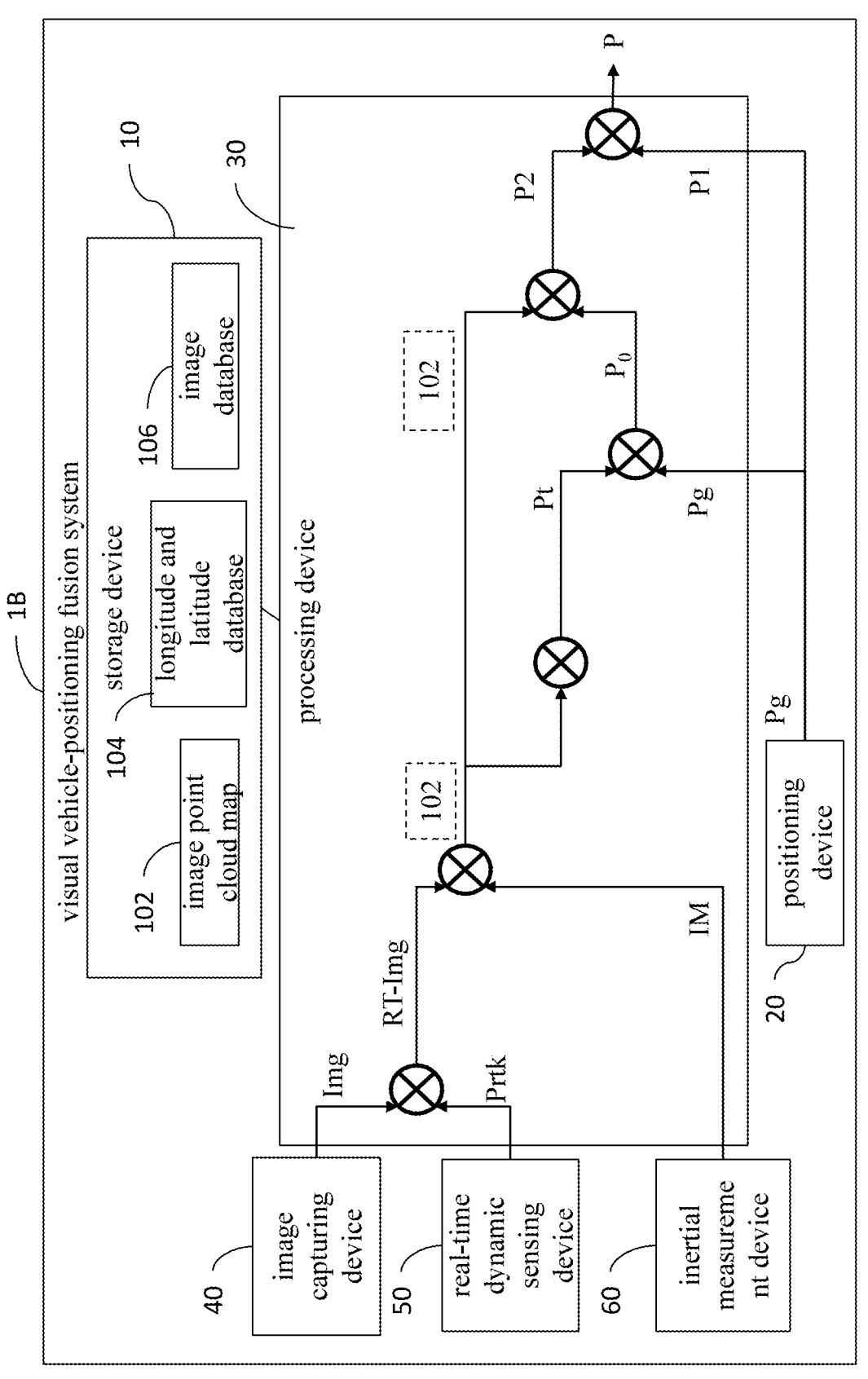
FIG. 5 is a block diagram schematically showing a visual vehicle-positioning fusion system according to a second embodiment of the present invention.

Please refer to FIG. 5. The visual vehicle-positioning fusion system 1B of the present invention is used to construct the image point cloud map. The visual vehicle-positioning fusion system 1B is different from the visual vehicle-positioning fusion system 1A of the first embodiment in that the visual vehicle-positioning fusion system 1B includes an image capturing device 40, a real-time sensing device 50, and an inertial measurement device 60. The storage device 10 further includes an image database 106. The image capturing device 40 arranged on the vehicle and configured to generate driving images Img of the vehicle. The real-time sensing device 50 uses real time kinematic technology. The real-time sensing device 50 is arranged on the vehicle and configured to generate real-time dynamic information Prtk of the vehicle. The processing device 30 fuses the driving images Img and the real-time dynamic information Prtk to generate real-time images RT-Img. The image database 106 is configured to store the real-time images RT-Img consecutively generated.

The visual synchronous positioning technology is used to generate the synchronous data of the real-time images RT-Img by align the real-time dynamic information Prtk to the driving images Img on the timeline. The frames of the consecutive real-time images RT-Img stored in the image database 106 in order of capturing image.

The inertial measurement device 60 has an inertial measurement unit (IMU). The inertial measurement device 60 is arranged on the vehicle and configured to generate the inertial measurement information IM of the vehicle. The inertial measurement information IM includes angle velocity information and acceleration information.

The processing device 30 accesses the real-time images RT-Img in the image database 106, respectively fuses each of the real-time images RT-Img with the inertial measurement information IM, respectively extracts a plurality of feature points of each of the real-time images RT-Img, and performs local mapping and loop closure detection based on the plurality of feature points and the inertial measurement information IM to construct the image point cloud map 102.

The visual simultaneous localizing and mapping (VSLAM) technology is used to construct the image point cloud map 102. Based on feature extraction algorithms like oriented features from accelerated segment test (FAST) and rotated binary robust independent elementary features (BRIEF) abbreviated as Oriented FAST and Rotated BRIEF (ORB), map points are constructed. The map is constructed using the established image database 106. The processing device 30 extracts the feature points of each of the real-time images RT-Img using the following methods: (1) extraction of descriptors such as ORB for each feature point; (2) feature matching; (3) detection of keyframes; and (4) interpolation of keyframes. The processing device 30 performs local mapping using the following methods: (1) interpolation of keyframes into the map and (2) removal of map points. The processing device 30 performs loop closure detection using the following methods: (1) determining whether there is a keyframe; (2) updating keyframes in a covisibility graph; and (3) fusing repeated map points.

Figure 6:
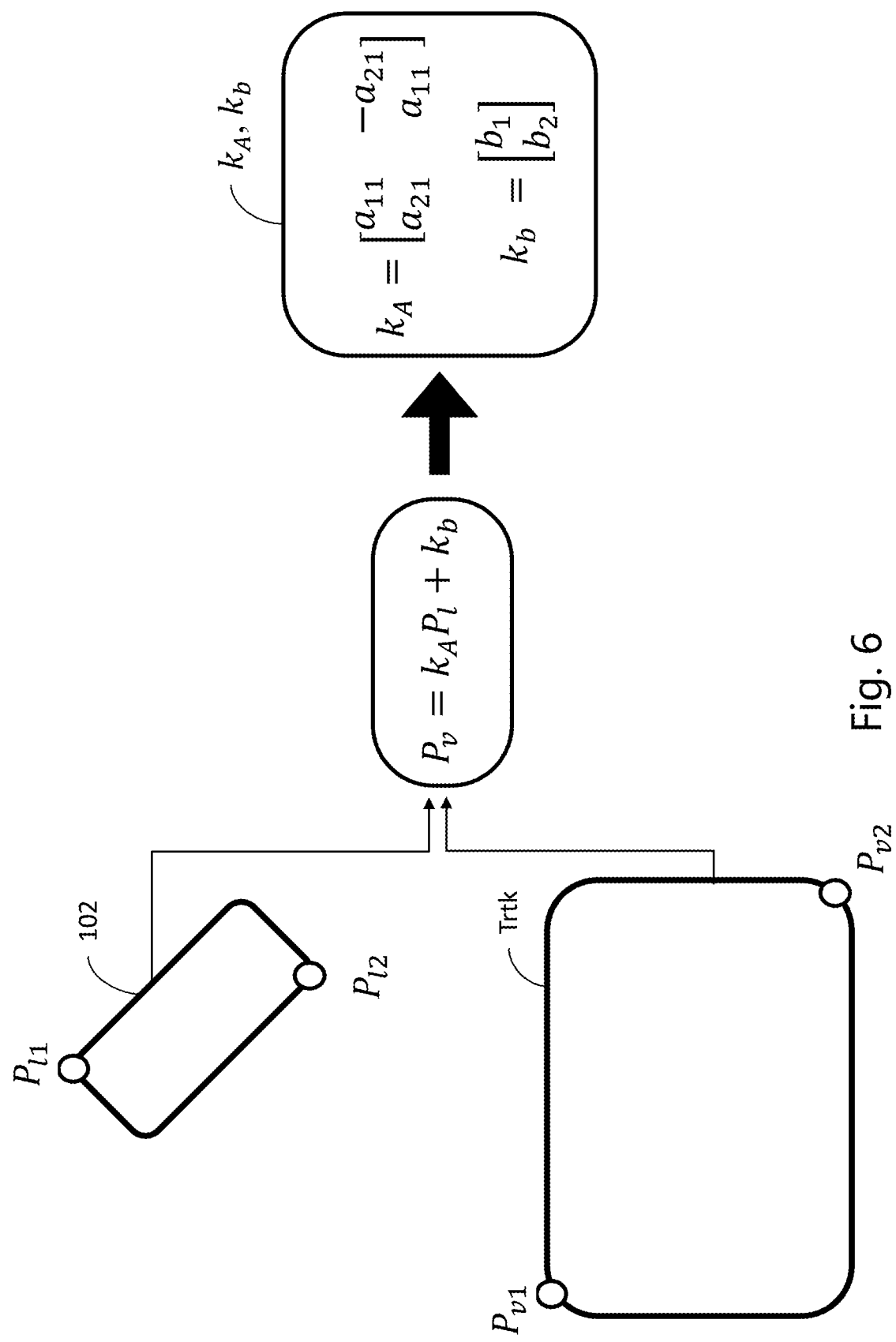
FIG. 6 is a diagram schematically showing that the processing device of the visual vehicle-positioning fusion system performs scale restoration according to the second embodiment of the present invention.

Please refer to FIG. 5 and FIG. 6. Scale restoration is further performed in order to construct the image point cloud map 102. Using linear transformation, a local coordinate is converted into a latitude and a longitude. Scale restoration is expressed as follows. The processing device 30 selects the local coordinate $P_l$ of the image point cloud map 102. The real-time dynamic information Prtk has a longitude and latitude trajectory Trtk. The processing device 30 selects the reference longitude and latitude coordinate $P_v$ of the longitude and latitude trajectory Trtk, which corresponds to the local coordinate $P_l$. The processing device 30 calculates scale conversion parameters $k_A$ and $k_b$ based on the local coordinate $P_l$ and the reference longitude and latitude coordinate $P_v$, as represented in equation (2).

$$P_v = k_A P_l + k_b \tag{2}$$

In equation (2), the scale conversion parameters $k_A$ and $k_b$ are represented by $$k_A = \begin{bmatrix} a_{11} & -a_{21} \\ a_{21} & a_{11} \end{bmatrix} \text{ and } k_b = \begin{bmatrix} b_1 \\ b_2 \end{bmatrix}.$$

As shown in FIG. 6, the processing device 30 obtains the local coordinates $P_{l1}$ and $P_{l2}$ and the corresponding the reference longitude and latitude coordinates $P_{v1}$ and $P_{v2}$ and interpolates the local coordinates $P_{l1}$ and $P_{l2}$ and the corresponding the reference longitude and latitude coordinates $P_{v1}$ and $P_{v2}$ into equation (2) to calculate the scale conversion parameters $k_A$ (having coefficients $a_{11}$ and $a_{21}$) and $k_b$ (having coefficients $b_1$ and $b_2$). Finally, the processing device 30 performs feature matching on the initial location $P_0$ and the image point cloud map 102 based on the scale conversion parameters $k_A$ and $k_b$ to generate the second location information P2.

Figure 7:
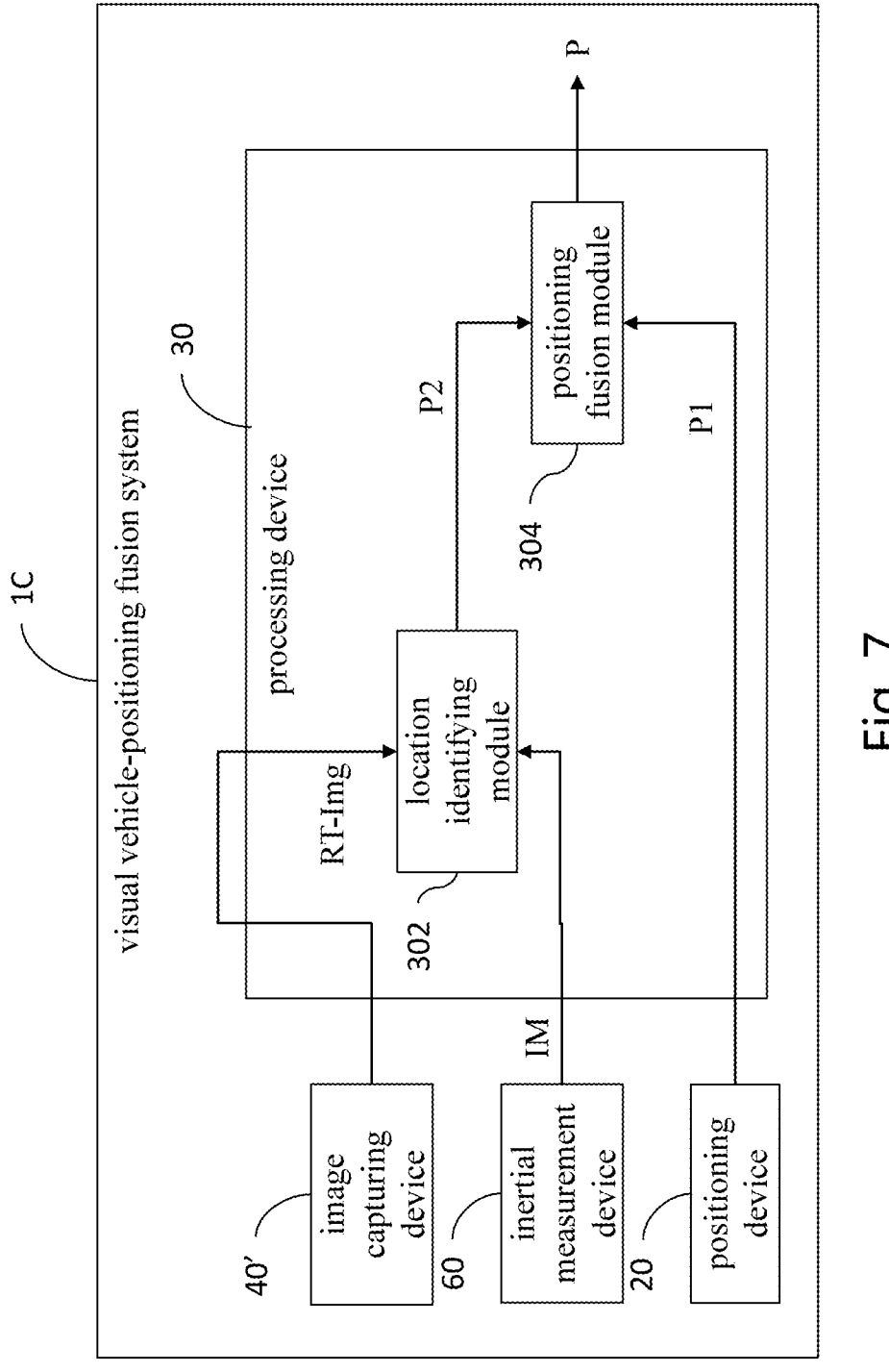
FIG. 7 is a block diagram schematically showing a visual vehicle-positioning fusion system according to a third embodiment of the present invention.

Please refer to FIG. 7. The visual vehicle-positioning fusion system 1C includes a positioning device 20, a processing device 30, an image capturing device 40' and an inertial measurement device 60. The processing device 30 includes a location identifying module 302 and a positioning fusion module 304. The recognition module 302 receives the real-time images RT-Img and inertial measurement information IM outputted by the image capturing device 40' and the inertial measurement device 60 and extracts the feature points of the real-time images RT-Img to construct the map points and the image point cloud map. The location identifying module 302 performs matching on the feature points of the real-time images RT-Img and the constructed image point cloud map to obtain the local coordinate of the vehicle. Using linear transformation, the location identifying module 302 converts the local coordinate into longitude and latitude information, namely the reference longitude and latitude coordinate. The positioning fusion module 304 may determine the positioning output information P based on a voting rule. The positioning fusion module 304 uses a Kalman filter to estimate the optimal location information, namely the estimated reference location. Then, the positioning fusion module 304 compares the estimated reference location to the measurement values (i.e., the first location information P1 and the second location information P2) of the sensors (i.e., the positioning device 20, the image capturing device 40', and the inertial measurement device 60) to determine the final positioning output information P.

The location identifying module 302 performs image recognition and map construction. The positioning fusion module 304 performs positioning fusion and sensing fusion. The location identifying module 302 and the positioning fusion module 304 may independently operate. Alternatively, the location identifying module 302 and the positioning fusion module 304 may be integrated in the same system, but the present invention is not limited thereto.

Although the concept of the visual vehicle-positioning fusion method has been explained concurrently with the visual vehicle-positioning fusion system of the present invention. FIGS. 8-11 show the flowcharts of the visual vehicle-positioning fusion method for clarity.

Please refer to FIG. 8. The visual vehicle-positioning fusion method, performed by the processing device, includes the following steps:

In Step S11, an image point cloud map stored in a storage device is converted into a longitude and latitude database corresponding to the image point cloud map.

In Step S12, longitude and latitude measurement coordinates received by a positioning device are used as first location information.

In Step S13, the longitude and latitude database is compared with the longitude and latitude measurement coordinates to generate the initial location of a vehicle.

In Step S14, feature matching is performed on the initial location and the image point cloud map to generate the second location information of the vehicle on the image point cloud map.

In Step S15, the first location information or the second location information is selected and outputted to serve as the final positioning output information based on a positioning fusion rule.

Please refer to FIG. 8 and FIG. 9. Step S15 may include the following steps:

In Step S151, the first location information and the second location information are fused to obtain an estimated reference location.

In Step S152, a first difference value between the estimated reference location and the first location information is calculated and a second difference value between the estimated reference location and the second location information is calculated.

In Step S153, the process determines whether the first difference value is less than the second difference value. If the result is yes, the process proceeds to Step S154. In Step S154, the first location information as the positioning output information is outputted. If the result is no, the process proceeds to Step S155. In Step S155, the second location information as the positioning output information is outputted.

Please refer to FIG. 8 and FIG. 10. The visual vehicle-positioning fusion method may further include the step of constructing the image point cloud map before Step S11 in FIG. 8. The step of constructing the image point cloud map may include the following steps:

In Step S101, driving images generated by an image capturing device and real-time dynamic information generated by a real-time dynamic sensing device are fused to generate real-time images.

In Step S102, the real-time images consecutively generated are stored into the image database of the storage device.

In Step S103, the real-time images are accessed in the image database.

In Step S104, each of the real-time images is respectively fused with the inertial measurement information of the vehicle generated by an inertial measurement device.

In Step S105, a plurality of feature points of each of the real-time images are respectively extracted and local mapping and loop closure detection are performed based on the plurality of feature points and the inertial measurement information to construct the image point cloud map.

Please refer to FIG. 8 and FIG. 11. Step S14 in FIG. 8 may further include the following steps:

In Step S141, the local coordinate of the image point cloud map is selected and the reference longitude and latitude coordinate of the longitude and latitude trajectory of the real-time dynamic information corresponding to the local coordinate is selected.

In Step S142, scale conversion parameters are calculated based on the local coordinate and the reference longitude and latitude coordinate.

In Step S143, feature matching is performed on the initial location and the image point cloud map based on the scale conversion parameters to generate the second location information.

In conclusion, the visual vehicle-positioning fusion system and the method thereof of the present invention can construct the image point cloud map, convert the image point cloud map into the longitude and latitude database, retrieve the longitude and the latitude (e.g., a first location) of a global positioning system (GPS) on the vehicle, and compares the first location with the longitude and latitude database to rapidly obtain the present rough location of the vehicle. After obtaining the present rough location of the vehicle, feature matching is performed to obtain the present precise location (e.g., a second location) of the vehicle on the image point cloud map. Finally, the first location or the second location is determined and outputted based on the voting rule. This way, the present invention can improve the accuracy and reliability of the autonomous driving system so that the need for a single expensive sensor is eliminated to reduce costs.

The embodiments described above are only to exemplify the present invention but not to limit the scope of the present invention. Any equivalent modification or variation according to the shapes, structures, characteristics and spirit disclosed in the specification is to be also included by the scope of the present invention.

What is claimed is:

1. A visual vehicle-positioning fusion system, which is suitable for an on-board system of a vehicle, the visual vehicle-positioning fusion system comprising:

a storage device configured to store an image point cloud map;

a positioning device arranged on the vehicle and obtained longitude and latitude measurement coordinates of the vehicle; and a processing device configured to convert the image point cloud map into a longitude and latitude database corresponding to the image point cloud map, use the longitude and latitude measurement coordinates as first location information, the first location information refers to the vehicle position measured by the positioning device;

the processing device queries location coordinate points in the longitude and latitude database, and compares the longitude and latitude database with the longitude and latitude measurement coordinates, obtains the location coordinate point which is closest to the present longitude and latitude measurement coordinates and used as an initial location of the vehicle, the processing device performs feature matching on the initial location and the image point cloud map to generate second location information, the second location information refers to the vehicle position obtained through feature matching based on the image point cloud map;

the processing device fuses the first location information and the second location information to obtain an estimated reference location, calculates a first difference value between the estimated reference location and the first location information, and calculates a second difference value between the estimated reference location and the second location information;

the processing device selects and outputs the first location information or the second location information based on a positioning fusion rule, wherein the positioning fusion rule defines to use the first location information outputted by the processing device as positioning output information when the first difference value less than the second difference value and defines to use the second location information outputted by the processing device as the positioning output information when the second difference value less than the first difference value.

2. The visual vehicle-positioning fusion system according to claim 1, wherein the processing device is configured to use a Kalman filter to generate the estimated reference location.

3. The visual vehicle-positioning fusion system according to claim 1, further comprising:

an image capturing device arranged on the vehicle and configured to generate driving images; and a real-time dynamic sensing device arranged on the vehicle and configured to generate real-time dynamic information of the vehicle;

wherein the processing device is configured to fuse the driving images and the real-time dynamic information to generate real-time images;

wherein the storage device has an image database that is configured to store the real-time images consecutively generated.

4. The visual vehicle-positioning fusion system according to claim 2, further comprising an inertial measurement device arranged on the vehicle and configured to generate inertial measurement information of the vehicle; and the processing device is configured to access the real-time images in the image database, respectively fuse each of the real-time images with the inertial measurement information, respectively extract a plurality of feature points of each of the real-time images, and perform local mapping and loop closure detection based on the plurality of feature points and the inertial measurement information to construct the image point cloud map.

5. The visual vehicle-positioning fusion system according to claim 2, wherein the real-time dynamic information of the vehicle has a longitude and latitude trajectory, and the processing device is configured to select a local coordinate of the image point cloud map and select a reference longitude and latitude coordinate of the longitude and latitude trajectory corresponding to the local coordinate, calculate scale conversion parameters based on the local coordinate and the reference longitude and latitude coordinate, and perform feature matching on the initial location and the image point cloud map based on the scale conversion parameters to generate the second location information.

6. A visual vehicle-positioning fusion method, performed by a processing device, the visual vehicle-positioning fusion method comprising:

converting an image point cloud map stored in a storage device into a longitude and latitude database corresponding to the image point cloud map;

using longitude and latitude measurement coordinates received by a positioning device as first location information, wherein the first location information refers to a vehicle position measured by the positioning device;

querying location coordinate points in the longitude and latitude database, and comparing the longitude and latitude database with the longitude and latitude measurement coordinates, obtaining the location coordinate point which is closest to the present longitude and latitude measurement coordinates and used as an initial location of the vehicle;

performing feature matching on the initial location and the image point cloud map to generate second location information, wherein the second location information refers to the vehicle position obtained through feature matching based on the image point cloud map;

fusing the first location information and the second location information to obtain an estimated reference location;

calculating a first difference value between the estimated reference location and the first location information and calculating a second difference value between the estimated reference location and the second location information;

selecting and outputting the first location information or the second location information based on a positioning fusion rule, wherein the positioning fusion rule defines to use the first location information outputted by the processing device as positioning output information when the first difference value less than the second difference value and defines to use the second location information outputted by the processing device as the positioning output information when the second difference value less than the first difference value.

7. The visual vehicle-positioning fusion method according to claim 6, wherein in the step of fusing the first location information and the second location information, a Kalman filter is used to generate the estimated reference location.

8. The visual vehicle-positioning fusion method according to claim 6, further comprising:

fusing driving images generated by an image capturing device and real-time dynamic information generated by a real-time dynamic sensing device to generate real-time images; and

storing the real-time images consecutively generated into an image database of the storage device.

9. The visual vehicle-positioning fusion method according to claim 8, further comprising:

accessing the real-time images in the image database;

respectively fusing each of the real-time images with inertial measurement information of the vehicle generated by an inertial measurement device; and respectively extracting a plurality of feature points of each of the real-time images and performing local mapping and loop closure detection based on the plurality of feature points and the inertial measurement information to construct the image point cloud map.

10. The visual vehicle-positioning fusion method according to claim 8, the step of performing feature matching on the initial location and the image point cloud map comprising:

selecting a local coordinate of the image point cloud map and selecting a reference longitude and latitude coordinate of the longitude and latitude trajectory of the real-time dynamic information, which corresponds to the local coordinate;

calculating scale conversion parameters based on the local coordinate and the reference longitude and latitude coordinate; and performing feature matching on the initial location and the image point cloud map based on the scale conversion parameters to generate the second location information.

* * * * *